(12) United States Patent
Kim

(10) Patent No.: US 11,714,788 B2
(45) Date of Patent: Aug. 1, 2023

(54) METHOD FOR BUILDING DATABASE IN WHICH VOICE SIGNALS AND TEXTS ARE MATCHED AND A SYSTEM THEREFOR, AND A COMPUTER-READABLE RECORDING MEDIUM RECORDING THE SAME

(71) Applicant: LG ELECTRONICS INC., Seoul (KR)

(72) Inventor: Dami Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 727 days.

(21) Appl. No.: 16/573,755

(22) Filed: Sep. 17, 2019

(65) Prior Publication Data

US 2020/0012627 A1    Jan. 9, 2020

(30) Foreign Application Priority Data

Aug. 27, 2019  (KR) .......................... 10-2019-0105075

(51) Int. Cl.
| | |
|---|---|
| *G06F 16/00* | (2019.01) |
| *G06F 16/21* | (2019.01) |
| *G10L 15/22* | (2006.01) |
| *G06F 16/2455* | (2019.01) |
| *G10L 25/51* | (2013.01) |

(Continued)

(52) U.S. Cl.
CPC ...... *G06F 16/211* (2019.01); *G06F 16/24558* (2019.01); *G06F 16/61* (2019.01); *G10L 15/22* (2013.01); *G10L 25/51* (2013.01)

(58) Field of Classification Search
None
See application file for complete search history.

(56) References Cited

U.S. PATENT DOCUMENTS

| | | | | |
|---|---|---|---|---|
| 8,489,399 B2* | 7/2013 | Gross | .................... | H04L 63/102 |
| | | | | 704/265 |
| 8,536,976 B2* | 9/2013 | Headley | .................. | G06F 21/34 |
| | | | | 340/5.82 |
| 9,192,861 B2* | 11/2015 | Gross | .................... | A63F 13/215 |

(Continued)

OTHER PUBLICATIONS

Wikipedia-CAPTCHA-https:/ko.wikipedia.org/wiki/CAPTCHA, Mar. 25, 2019, pp. 1-7 (9 pages total), with a partial English Translation.

*Primary Examiner* — Polina G Peach
(74) *Attorney, Agent, or Firm* — Birch, Stewart, Kolasch & Birch, LLP

(57) ABSTRACT

According to an embodiment, a method of building a database in which voice signals match texts comprises providing a captcha-purposed voice signal including a first voice signal matched with a first text and a second voice signal matched with no text, sending a request for a first input text and a second input text for the captcha-purposed voice signal, when the first input text and the second input text are received, comparing the first text with the first input text, and when the first text is identical to the first input text, matching the second voice signal with the second input text and storing the match. Embodiments of the present invention may be related to artificial intelligence (AI) modules, unmanned aerial vehicles (UAVs), robots, augmented reality (AR) devices, virtual reality (VR) devices, and 5G service-related devices.

12 Claims, 11 Drawing Sheets

(51) Int. Cl.
  *G06F 16/61* (2019.01)
  *G06F 16/30* (2019.01)

(56) References Cited

U.S. PATENT DOCUMENTS

| | | | | |
|---|---|---|---|---|
| 10,038,676 | B2 * | 7/2018 | Khalid | H04L 9/0841 |
| 10,050,787 | B1 * | 8/2018 | Johansson | H04L 9/0866 |
| 11,217,266 | B2 * | 1/2022 | Kawano | G10L 15/26 |
| 2002/0194003 | A1 * | 12/2002 | Mozer | G10L 17/00 |
| | | | | 704/270.1 |
| 2003/0163739 | A1 * | 8/2003 | Armington | H04L 9/3226 |
| | | | | 713/186 |
| 2009/0309698 | A1 * | 12/2009 | Headley | G06F 21/316 |
| | | | | 340/5.52 |
| 2009/0319270 | A1 * | 12/2009 | Gross | G10L 17/04 |
| | | | | 704/E15.001 |
| 2012/0004911 | A1 * | 1/2012 | Quan | G10L 15/20 |
| | | | | 704/235 |
| 2012/0004914 | A1 * | 1/2012 | Strom | G10L 21/0364 |
| | | | | 704/E17.001 |
| 2012/0084450 | A1 * | 4/2012 | Nagamati | G06F 21/31 |
| | | | | 709/229 |
| 2012/0173239 | A1 * | 7/2012 | Sanchez | G10L 17/06 |
| | | | | 704/E17.001 |
| 2012/0297190 | A1 * | 11/2012 | Shen | H04L 9/0866 |
| | | | | 713/168 |
| 2013/0031641 | A1 * | 1/2013 | Fisk | G06F 21/31 |
| | | | | 726/28 |
| 2013/0339018 | A1 * | 12/2013 | Scheffer | H04L 63/10 |
| | | | | 704/E15.001 |
| 2014/0163986 | A1 * | 6/2014 | Lee | G06F 21/31 |
| | | | | 704/248 |
| 2014/0259138 | A1 * | 9/2014 | Fu | H04L 63/0861 |
| | | | | 726/7 |
| 2014/0330568 | A1 * | 11/2014 | Lewis | G10L 15/22 |
| | | | | 704/273 |
| 2016/0248768 | A1 * | 8/2016 | McLaren | H04L 63/102 |
| 2017/0068805 | A1 * | 3/2017 | Chandrasekharan | G06F 3/165 |
| 2018/0352541 | A1 | 12/2018 | Le | |
| 2019/0018937 | A1 * | 1/2019 | Jadhav | G06F 21/31 |
| 2019/0141693 | A1 | 5/2019 | Guo et al. | |
| 2019/0172468 | A1 * | 6/2019 | Jain | G10L 15/22 |
| 2019/0189132 | A1 * | 6/2019 | Viswanathan | G10L 15/22 |
| 2019/0392834 | A1 * | 12/2019 | Yi | G01S 5/20 |
| 2020/0045745 | A1 * | 2/2020 | Cirik | H04B 7/0695 |
| 2020/0097643 | A1 * | 3/2020 | Uzun | G06F 21/32 |

\* cited by examiner

[Figure 1]
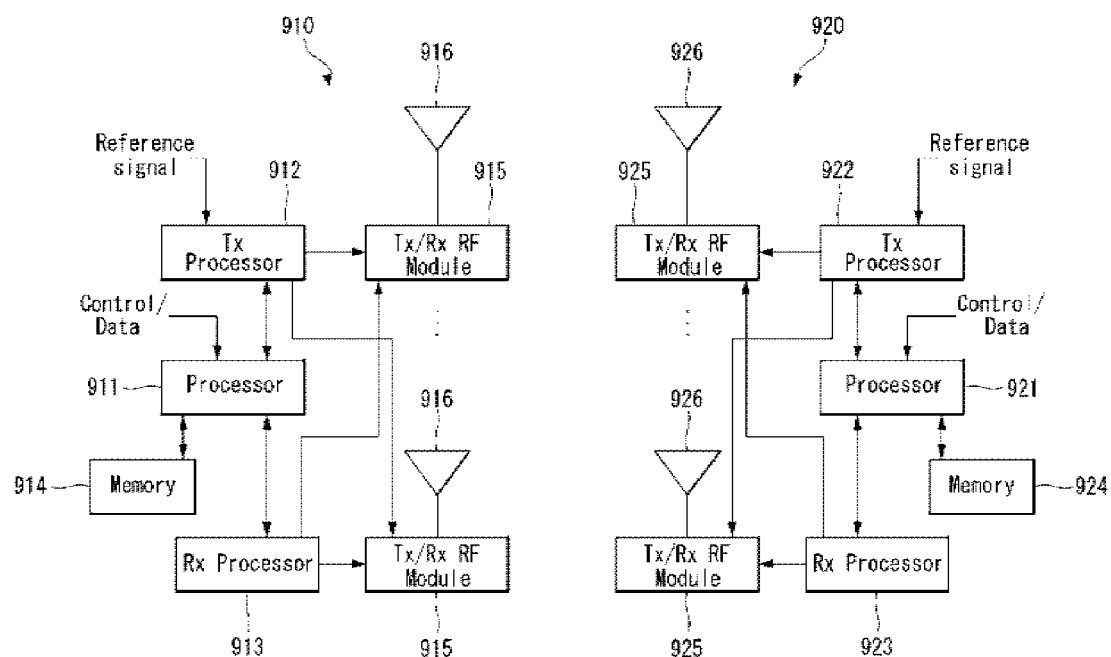

[Figure 2]
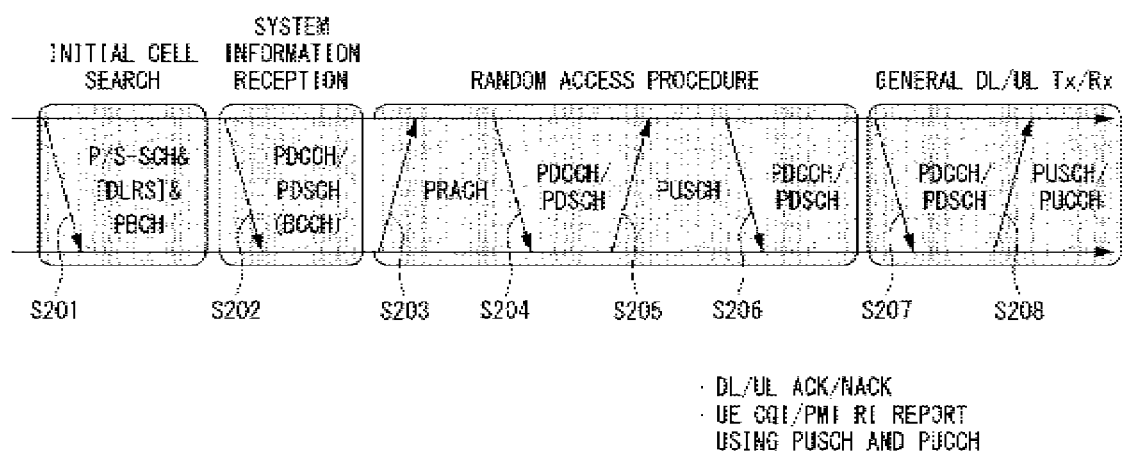

【Figure 3】
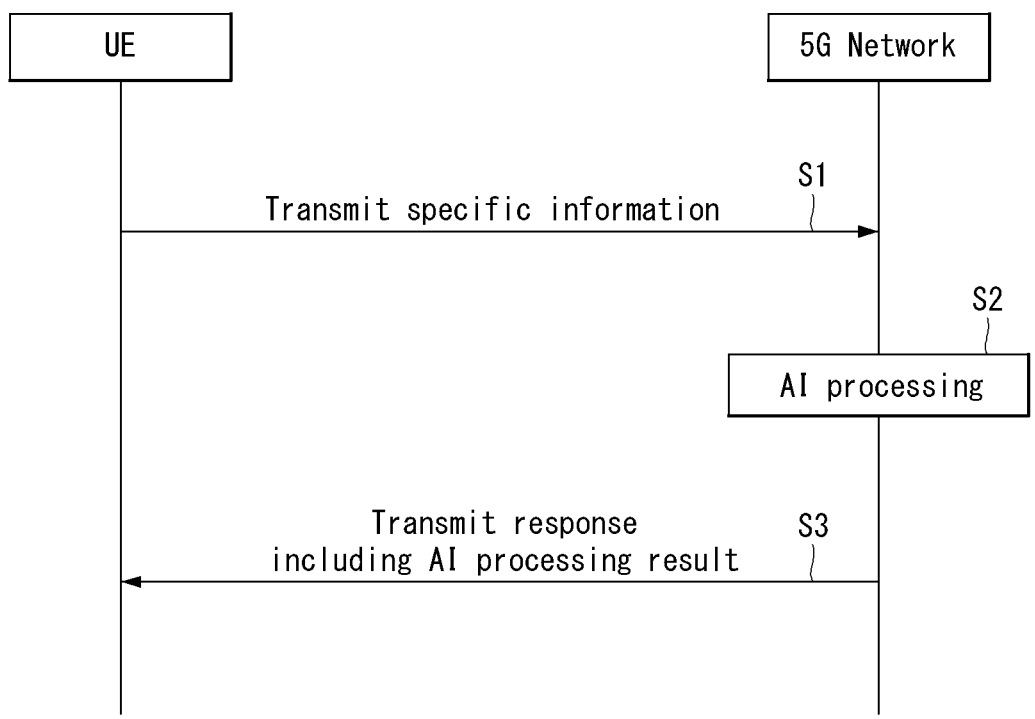

【Figure 4】
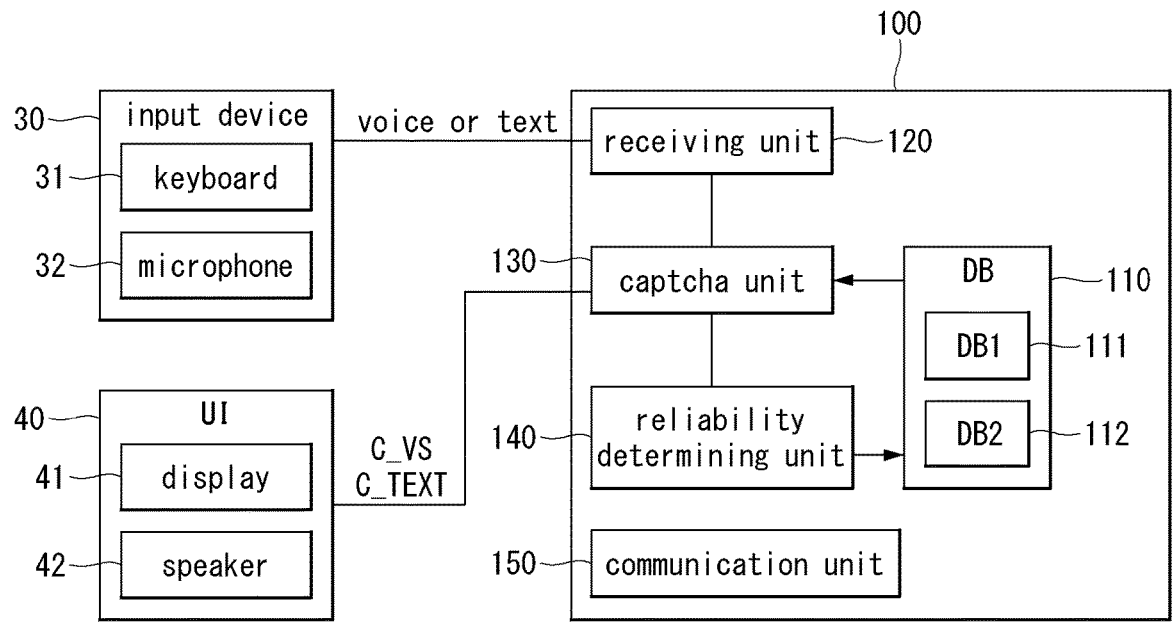
【Figure 5】
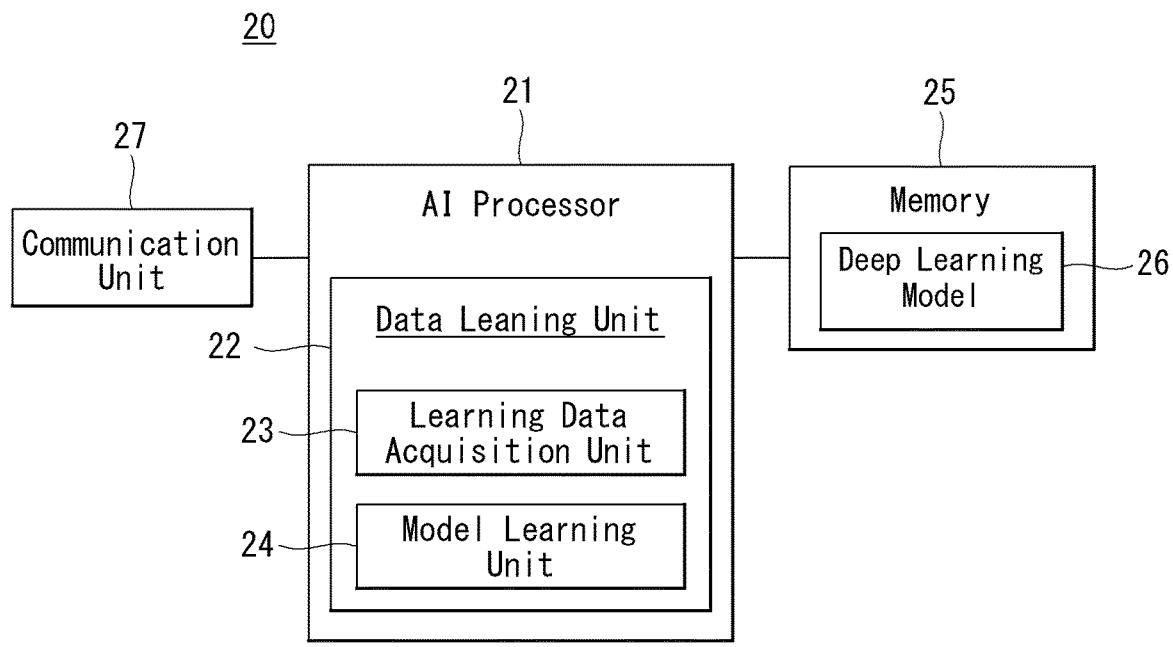

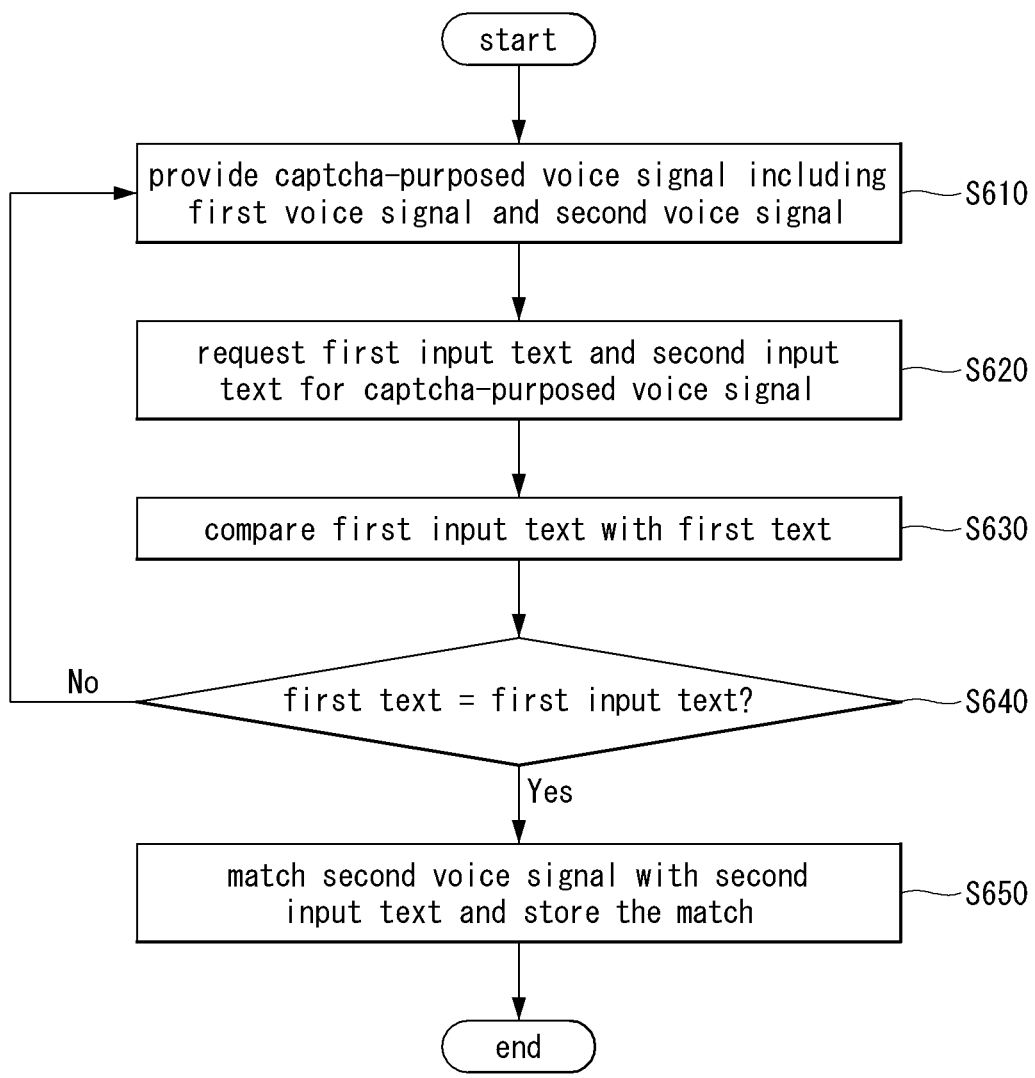
[Figure 6]

[Figure 7]
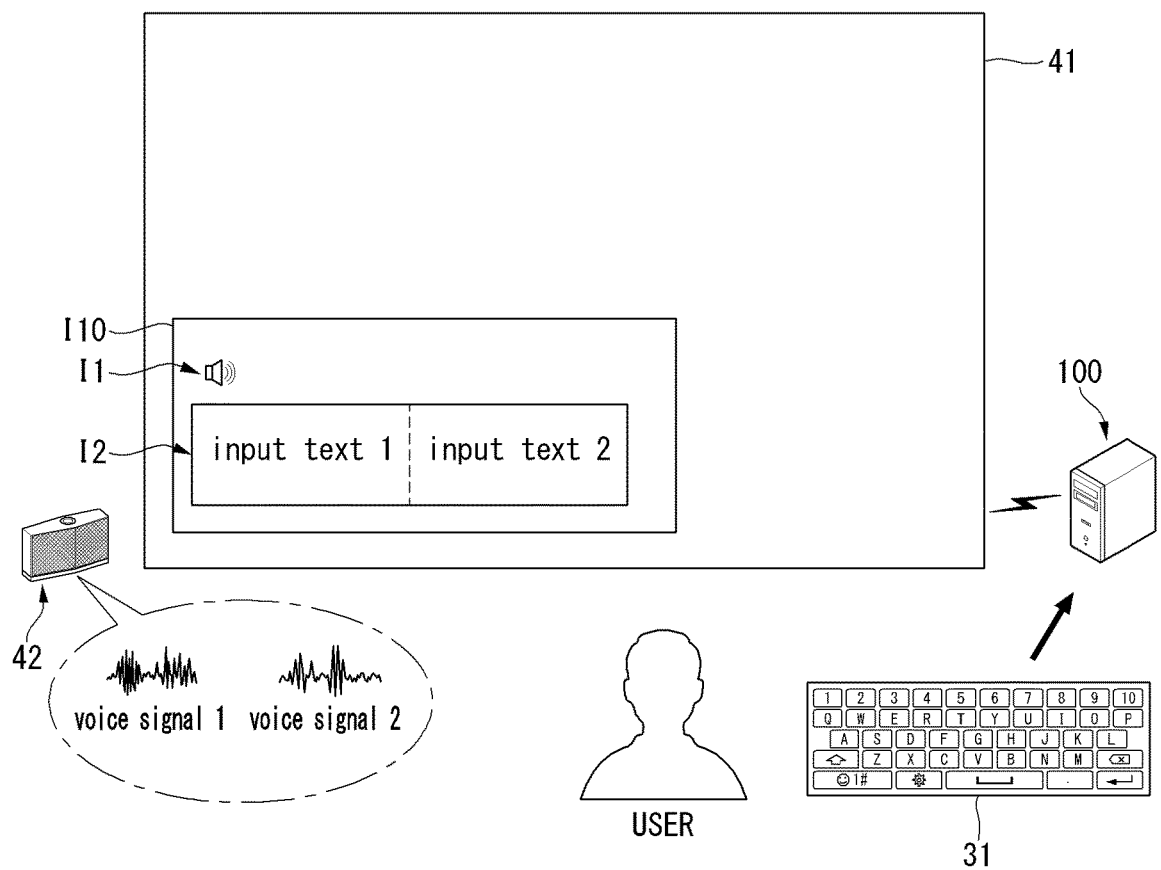

[Figure 8]
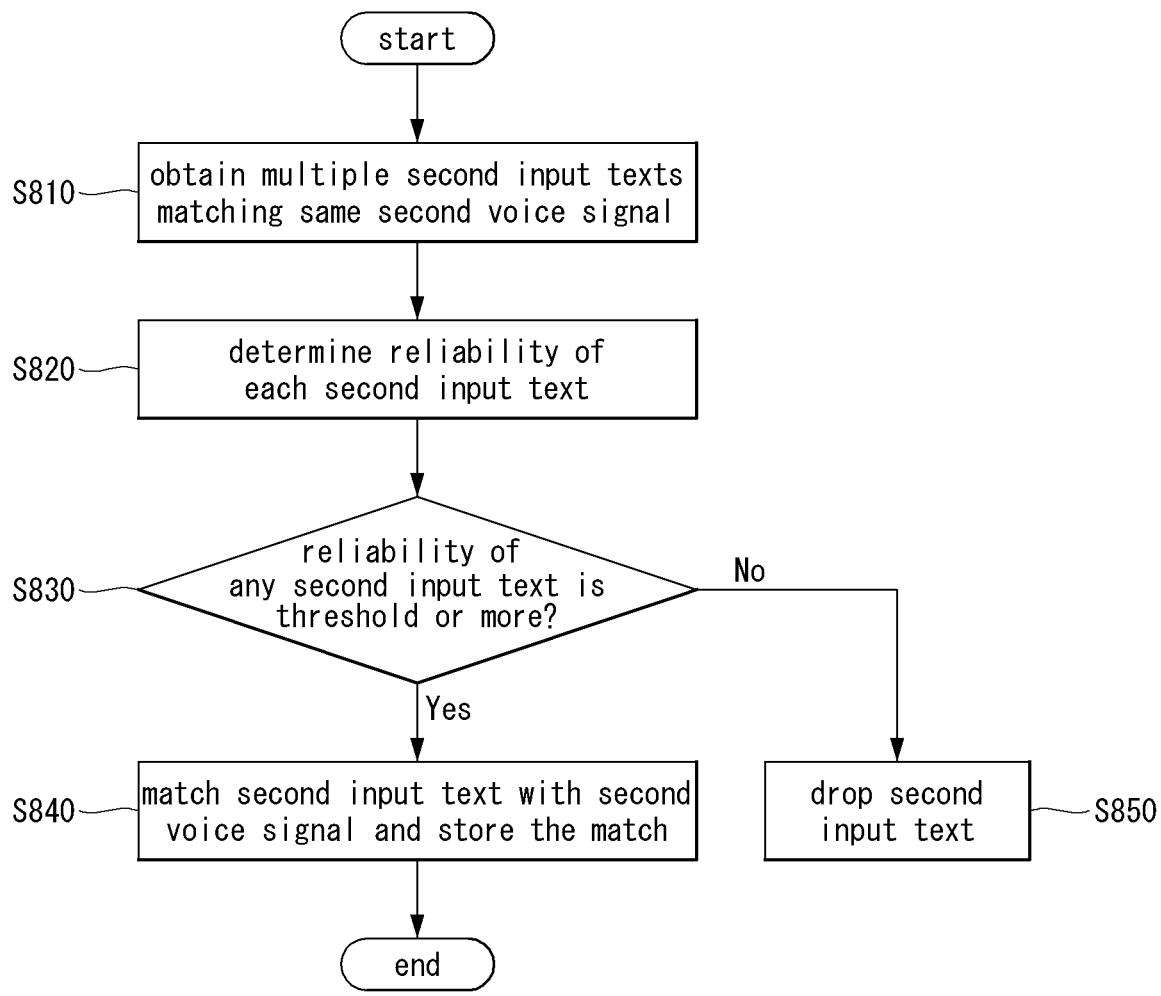

[Figure 9]
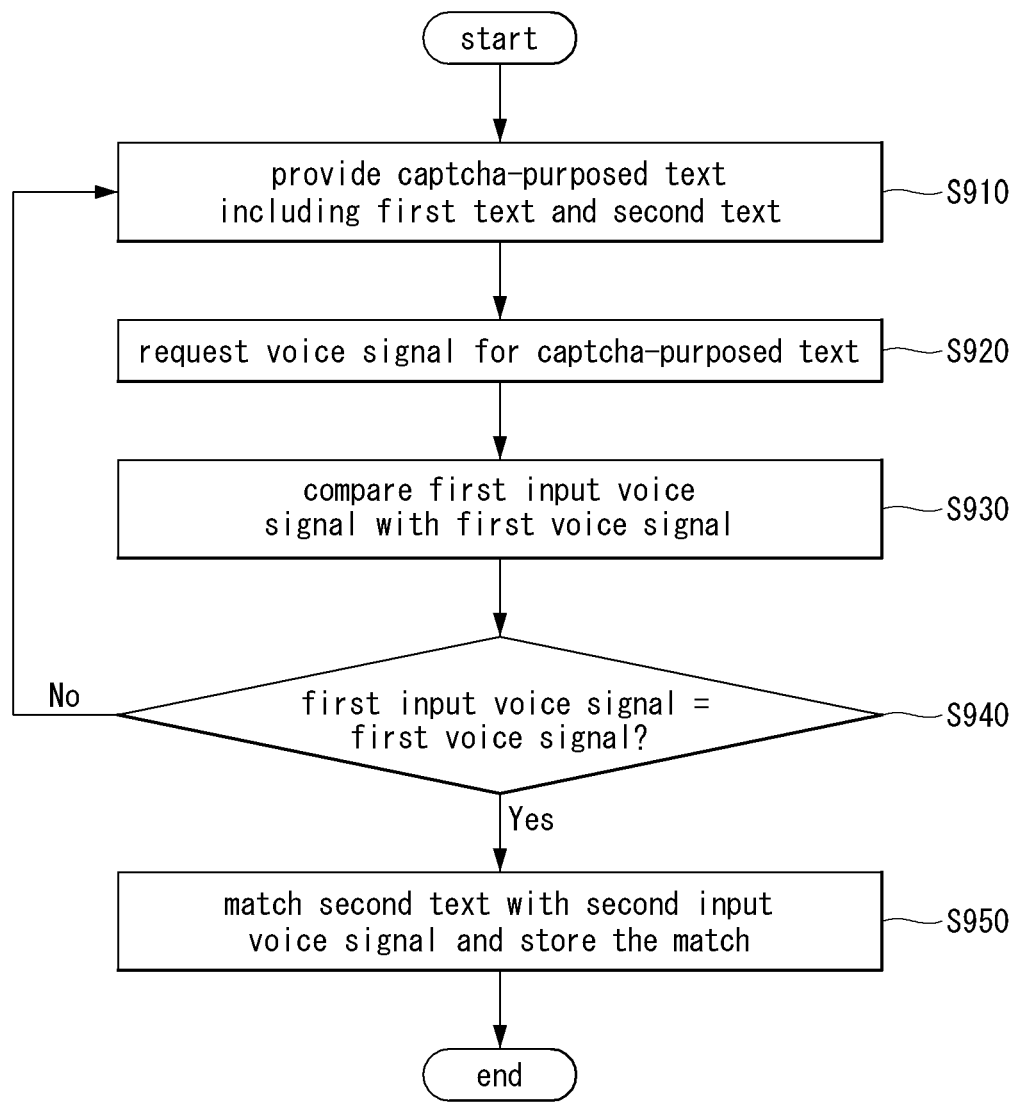

[Figure 10]
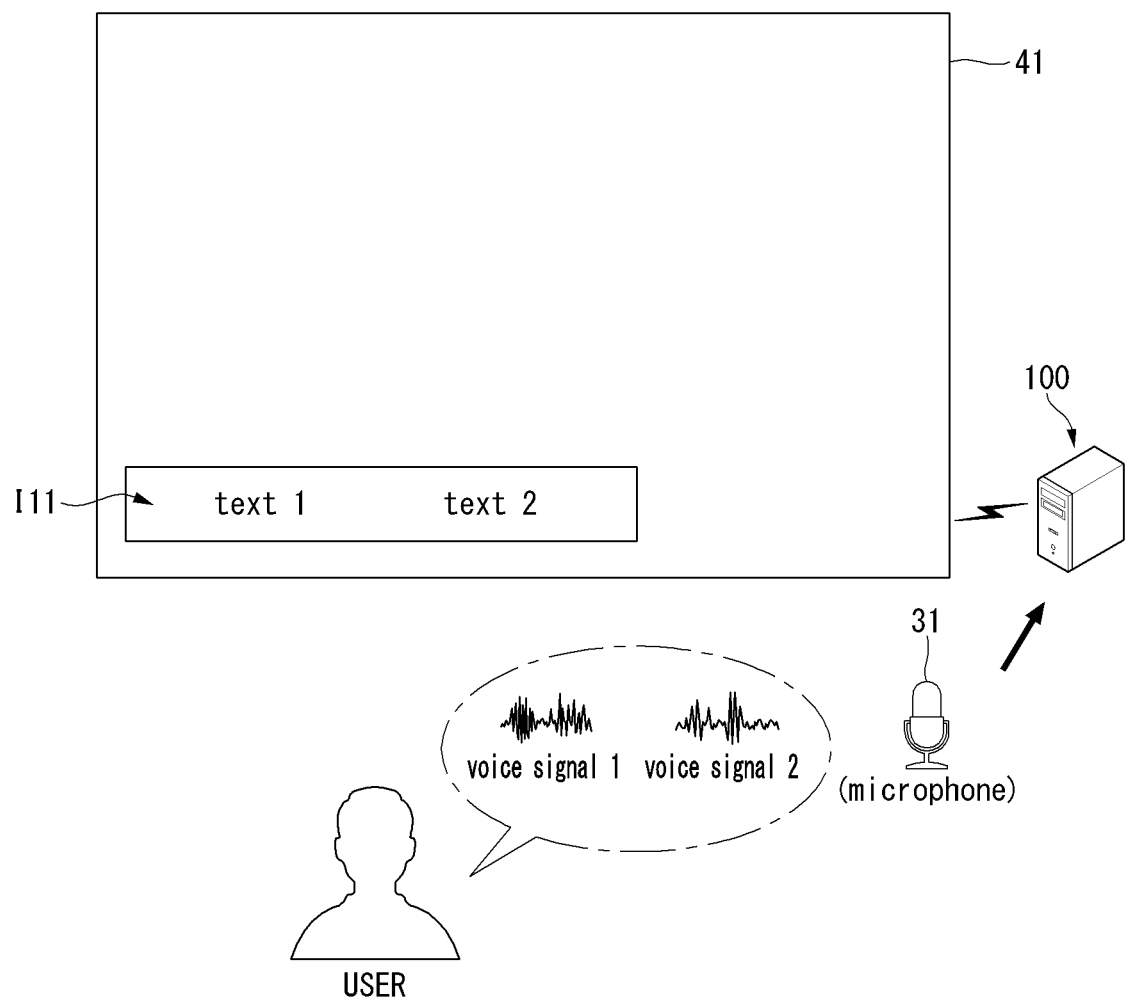

[Figure 11]
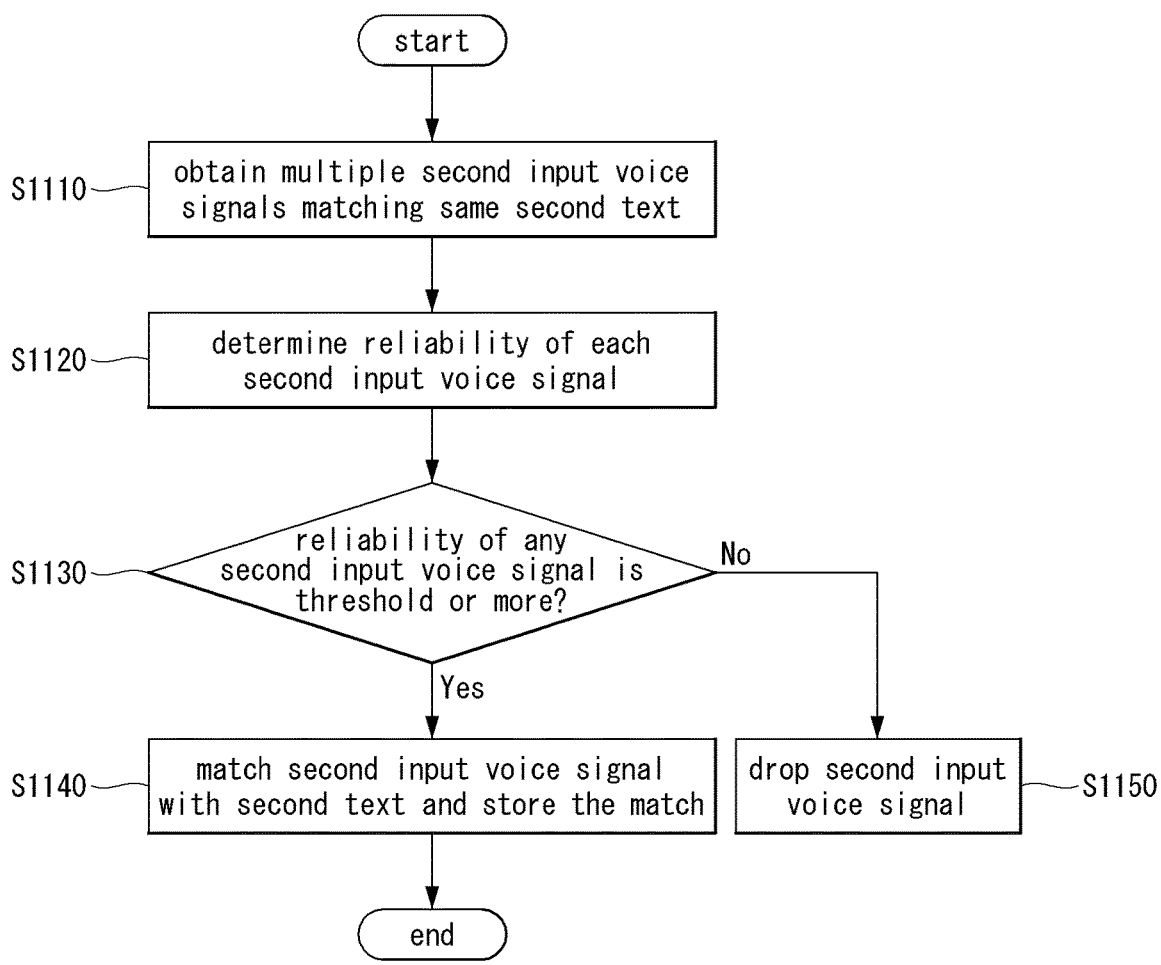

[Figure 12]
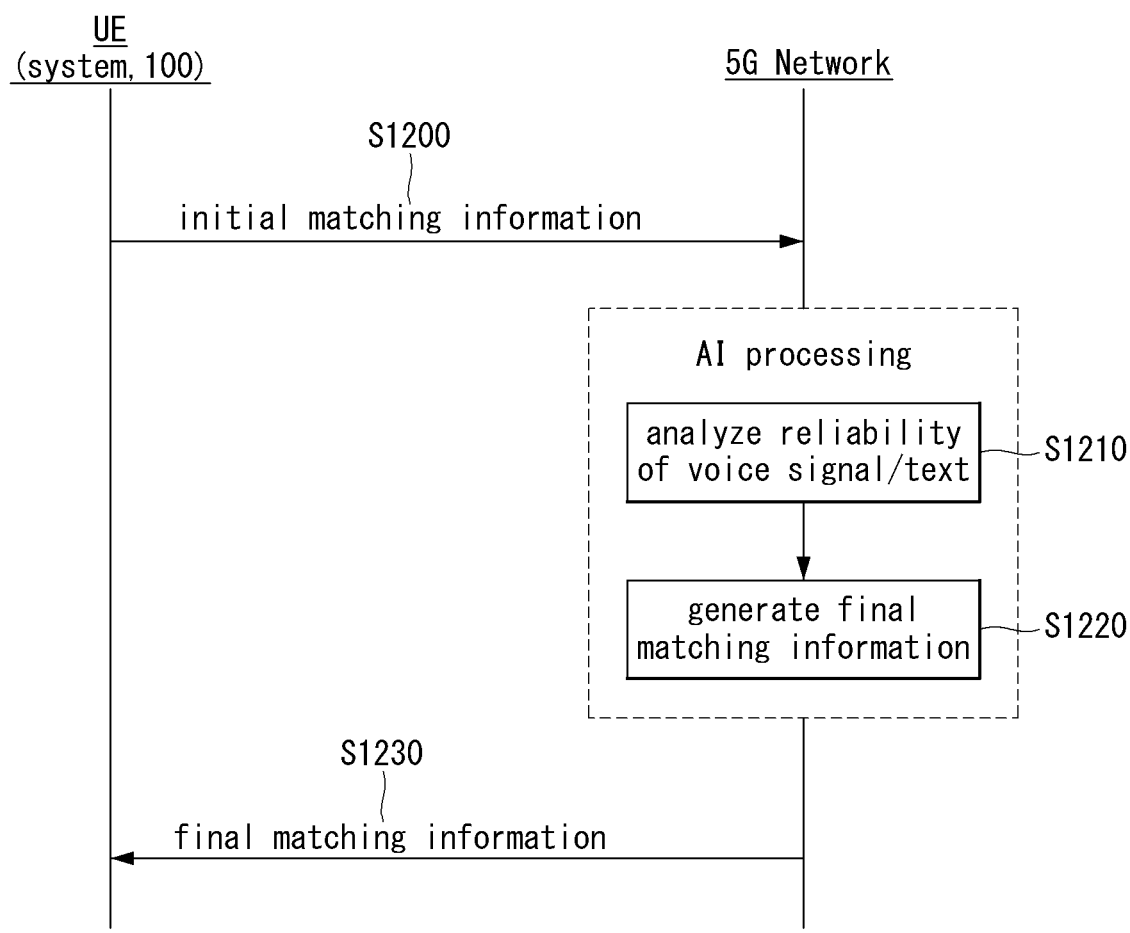

METHOD FOR BUILDING DATABASE IN WHICH VOICE SIGNALS AND TEXTS ARE MATCHED AND A SYSTEM THEREFOR, AND A COMPUTER-READABLE RECORDING MEDIUM RECORDING THE SAME

CROSS-REFERENCE TO RELATED APPLICATION(S)

This application is based on and claims priority under 35 U.S.C. 119 to Korean Patent Application No. 10-2019-0105075, filed on Aug. 27, 2019, in the Korean Intellectual Property Office, the disclosure of which is herein incorporated by reference in its entirety.

TECHNICAL FIELD

The present invention relates to a method and system for building a database storing voice signal-text matches and a computer-readable recording medium recording the same, and more particularly, to building a database in which voice signals and texts are matched therebetween based on a captcha system.

DESCRIPTION OF RELATED ART

User control-operated devices provide user interfaces through which users may perform control operations. User interfaces are evolving from direct control of the own functions and operations of devices to control which requires less physical power and may be achieved by intuitive operations. Recently increasing are speech recognition-enabled devices which may grasp users' voice or speeches and accordingly perform certain functions or operations. As language expressed in voice is a most natural human communication tool, speech recognition-based devices may be very intuitive and convenient to use.

Speech recognition-based devices are accompanied by the operations of interpreting users' speech and generating a particular control signal based on the interpreted speech.

Speech recognition-based devices typically convert received voice signals into text based on a speech recognition model and produce control signals based on the text. In other words, generation of a speech recognition model requires a procedure for matching voice signals with text.

A conventional way for creating a database storing matches of voice signals and texts is to record text readings. This may incur increased costs and time.

SUMMARY

The present invention aims to address the foregoing issues and/or needs.

The present invention aims to build a database for a speech recognition model while saving costs and time.

According to an embodiment of the present invention, a method of building a database in which voice signals match texts comprises providing a captcha-purposed voice signal including a first voice signal matched with a first text and a second voice signal matched with no text, sending a request for a first input text and a second input text for the captcha-purposed voice signal, when the first input text and the second input text are received, comparing the first text with the first input text, and when the first text is identical to the first input text, matching the second voice signal with the second input text and storing the match.

Providing the captcha-purposed voice signal may be provided upon preventing auto-registration in a website.

Providing the captcha-purposed voice signal may include setting a random order in which the first voice signal and the second voice signal are provided.

The second voice signal may include logging data for a website or a speech recognition electronic device.

Matching the second voice signal with the second input text and storing the match may include determining a reliability of the second input text and, when the reliability is a predetermined level or more, matching the second voice signal with the second input text.

Determining the reliability of the second input text may include gathering a plurality of second input texts matched with the second voice signal, dividing same texts of the plurality of second input texts gathered from the rest of the plurality of second input texts, and when the proportion of the same texts among the plurality of second input texts is a preset threshold or more, determining that the reliability of the same texts is a predetermined level or more.

Determining the reliability of the second input text may further include receiving, from a network, downlink control information (DCI) used for scheduling transmission of the texts, wherein the voice signals or the texts may be transmitted to the network based on the DCI.

Determining the reliability of the second input text may further include performing an initial access procedure with the network based on a synchronization signal block (SSB), wherein the texts may be transmitted to the network via a physical uplink shared channel (PUSCH), and wherein demodulation-reference signals (DM-RSs) of the SSB and the PUSCH may be quasi co-located (QCL) for QCL type D.

According to an embodiment of the present invention, a method of building a database in which voice signals match texts may comprise providing a captcha-purposed text including a first text matched with a first voice signal and a second text matched with no voice signal, sending a request for a first input voice signal and a second input voice signal for the captcha-purposed text, comparing the first voice signal with the first input voice signal, and when the first voice signal is identical to the first input voice signal, matching the second text with the second input voice signal and storing the match.

Providing the captcha-purposed text may be provided upon preventing auto-registration in a website.

Providing the captcha-purposed text may include setting a random order in which the first text and the second text are provided.

The second text may include logging data for a website.

Matching the second text with the second input voice signal and storing the match may include determining a reliability of the second input voice signal and, when the reliability is a predetermined level or more, matching the second text with the second input voice signal.

Determining the reliability of the second input voice signal may further include gathering a plurality of second input voice signals matched with the second text, dividing same voice signals of the plurality of second input voice signals gathered from the rest of the plurality of second input voice signals, and when the proportion of the same voice signals among the plurality of second input voice signals is a preset threshold or more , determining, that the reliability of the same voice signals is a predetermined level or more.

Determining the reliability of the second input voice signal may further include receiving, from a network, downlink control information (DCI) used for scheduling transmission of the voice signals, wherein the voice signals may be transmitted to the network based on the DCI.

Determining the reliability of the second input voice signal may further include performing an initial access procedure with the network based on a synchronization signal block (SSB), wherein the voice signals may be transmitted to the network via a physical uplink shared channel (PUSCH), and wherein demodulation-reference signals (DM-RSs) of the SSB and the PUSCH may be quasi co-located (QCL) for QCL type D.

There may be provided a computer-readable recording medium recording a program for performing each step of the above-described method.

According to an embodiment of the present invention, a system for building a database in which voice signals match texts comprises a receiving unit receiving a first input text and a second input text corresponding to a captcha-purposed voice signal including a first voice signal matched with a first text and a second voice signal matched with no text or receiving a first input voice signal and a second input voice signal corresponding to a captcha-purposed text corresponding to a first text matched with a first voice signal and a second text matched with no voice signal and a captcha unit comparing the first text with the first input text and, when the first text is identical to the first input text, matching the second voice signal with the second input text and storing the match in the database.

The captcha unit may compare the first voice signal with the first input voice signal and, when the first voice signal is identical to the first input voice signal, match the second text with the second input voice signal and store the match of the second text and the second input voice signal in the database.

The system may further comprise a reliability determining unit, when the second voice signal is identical to the second input voice signal, determining a reliability of the second input voice signal and, when the reliability of the second input voice signal is a preset threshold or more, matching the second text with the second input voice signal.

The system may further comprise a reliability determining unit, when the first text is identical to the first input text, determining a reliability of the second input text and, when the reliability of the second input text is a preset threshold or more, matching the second voice signal with the second input text.

According to an embodiment of the present invention, a method and system for building a database in which voice signals match texts provide the following effects.

According to the present invention, there is no need for a separate recording process for gathering data for a speech recognition model.

The present invention may gather voice signals obtained based on various user utterances, thereby creating a more accurate speech recognition model based on the voice signals.

BRIEF DESCRIPTION OF THE DRAWINGS

FIG. 1 is a block diagram illustrating a wireless communication system to which methods proposed herein may apply;

FIG. 2 is a view illustrating an example signal transmission/reception method in a wireless communication system;

FIG. 3 is a view illustrating, basic example operations of a user terminal and a 5G network in a 5G communication system;

FIG. 4 is a view illustrating a system for building a database in which voice signals match texts according to an embodiment of the present invention;

FIG. 5 is a block diagram illustrating an AI device according to an embodiment of the present invention;

FIG. 6 is a flowchart illustrating a method for building a database in which voice signals match texts according to a first embodiment of the present invention;

FIG. 7 is a view illustrating a method for building a database in which voice signals match texts according to the first embodiment of the present invention;

FIG. 8 is a flowchart illustrating an example of matching voice signals and texts based on reliability;

FIG. 9 is a flowchart illustrating a method for building a database in which voice signals match texts according to a second embodiment of the present invention;

FIG. 10 is a view illustrating a method for building a database in which voice signals match texts according to the second embodiment of the present invention;

FIG. 11 is a flowchart illustrating an example of matching voice signals and texts based on reliability; and FIG. 12 is a view illustrating a method for building a database in which voice signals match texts according to another embodiment of the present invention.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operaion.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/ environment device, a device associated with 5G services, or other devices associated with the fourth industrial revolution field.

For example, a terminal or user equipment (UE) may include a cellular phone, a smart phone, a laptop computer. a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925. Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PDCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNT1) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1 SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP'. the UE reports the best SSBRI and RSRP corresponding thereto to the BS.
- When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IF includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3)

extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (SI). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

FIG. 4 illustrates a system for building a database, e.g., a database in which voice signals match texts, according to the present invention.

Referring to FIG. 4, according to an embodiment of the present invention, a database building system includes a database 110, a receiving unit 120, a captcha unit 130, and a reliability determining unit 140.

The database 110 includes a first database 111 and a second database 112.

The first database 111 stores voice signals and texts, with the voice signals matched with the texts. Each text may be a single word or a combination of a plurality of words. Voice signal may refer to a utterance for a text and may denote a digital signal into which an analog utterance has been converted.

The second database 112 stores either voice signals or texts. Alternatively, the second database 112 stores voice signals and texts without matching them but rather independently from each other.

The receiving unit 120 receives input voice signals or texts via an input device 30.

The captcha unit 130 provides a captcha-purposed voice signal C_VS and a captcha-purposed text to a user interface (UI) 40 and performs a captcha based on the input voice signals or texts received via the receiving unit 120.

The captcha-purposed voice signal C_VS is provided to the user for obtaining a text for a voice signal and includes a first voice signal and a second voice signal. The first voice signal is extracted from the first database 111 and is a voice signal matched with the first text. The second voice signal is extracted from the second database 112 and is a voice signal matched with no text. The captcha unit 130 outputs the first voice signal matched with the first text and the second voice signal matched with no text via a speaker 42.

The captcha-purposed text C_TEXT is provided to the user for obtaining a voice signal for a text and includes a first text and a second text. The first text is extracted from the first database 111 and is a text matched with a first voice signal. The second text is extracted from the second database 112 and is a text matched with no voice signal. The captcha unit 130 displays the first text matched with the first voice signal and the second text matched with no voice signal via a display 41.

An input text corresponds to a text which the user enters via a keyboard 31, corresponding to the captcha-purposed voice signal C_VS. The input text includes a first input text corresponding to a first voice signal and a second input text corresponding to a second voice signal.

An input voice signal corresponds to a voice signal which the user enters via a microphone 32 corresponding to the captcha-purposed text. The input voice signal includes a first input voice signal corresponding to a first text and a second input voice signal corresponding to a second text.

The captcha unit 130 may compare the first input text entered corresponding to the first voice signal with the first text and, when the first input text is identical to the first text, match the second input text with the second voice signal and store the match of the second input text and the second voice signal in the first database 111. When the first input text is identical to the first text, the captcha unit 130 may match the second input text with the second voice signal and provide the match of the second input text and the second voice signal to the reliability determining unit 140.

The captcha unit 130 may compare the first input voice signal entered corresponding to the first text with the first voice signal and, when the first input voice signal is identical to the first voice signal, match the second input voice signal with the second text and store the match of the second input voice signal and the second text in the first database 111. When the first input voice signal is identical to the first voice signal, the captcha unit 130 may match the second input voice signal with the second text and provide the match of the second input voice signal and the second text to the reliability determining unit 140.

The reliability determining unit 140 determines the matching reliability of the match of the second voice signal and the second input text received from the captcha unit 130. The matching reliability denotes the accuracy of the second input text entered by the user for the second voice signal.

The second driving unit 36 determines the matching reliability of the match of the second text and the second input voice signal received from the captcha unit 130. The matching reliability denotes the accuracy of the second input voice signal entered by the user for the second text.

The reliability determining unit 140 may make use of a lookup table or an AI device described below and shown in FIG. 5.

The communication unit 150 may transmit the second voice signal and the second input text, which are matched with each other, or the second text and the second input voice signal, which are matched with each other, to an AI device or a 5G network.

FIG. 5 is a block diagram of an AI device according to an embodiment of the present invention.

Referring to FIG. 5, An AI device 20 may include an electronic device including an AI module that can perform AI processing, a server including the AI module, or the like.

Further, the AI device 20 may be included as at least one component of the database building system 100 shown in FIG. 4 to perform together at least a portion of the AI processing.

The AI processing may include all operations related to driving of the database building system 100 shown in FIG. 4.

The AI device 20 may be a client device that directly uses the AI processing result or may be a device in a cloud environment that provides the AI processing result to another device. The AI device 20 is a computing device capable of learning neural networks, and may be implemented as various electronic devices such as a server, a desktop PC, a notebook PC, a tablet PC, and the like.

The AI device 20 may include an AI processor 21, a memory 25, and/or a communication unit 27.

The AI processor 21 can learn a neural network using programs stored in the memory 25. In particular, the AI processor 21 can learn a neural network for recognizing data related to database building system 100. Here, the neural network for recognizing data related to database building system 100 may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks(CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27 etc., but it should be noted that the aforementioned components may be integrated in one module and referred to as an AI module.

FIG. 6 is a flowchart illustrating a method for building a database by matching voice signals with texts according to a first embodiment of the present invention. FIG. 7 is a view illustrating an example of providing a first and second voice signal and receiving texts according to the first embodiment.

A method of building a database by matching texts and voice signals is described below with reference to FIGS. 6 and 7.

In a first step S610, a captcha-purposed voice signal C_VS including a first voice signal and a second voice signal is provided.

The captcha-purposed voice signal C_VS may be provided as part of a captcha during the course of accessing a website or performing a particular procedure on the website. Completely automated public turing test to tell computers and humans apart (CAPTCHA) refers to a technique for differentiating between human beings and computers to prevent auto-registration.

For example, when a user USER signs up in a certain website, the captcha unit 130 may display an input window 110 on the display 41 which is displaying a webpage of the website. The input window 110 may display an icon 11 for receiving a command to output the captcha-purposed voice signal C_VS and a text input window 12.

When the user USER clicks on the icon 11 via the input device, e.g., a mouse (not shown). the captcha unit 130 outputs the captcha-purposed voice signal C_VS via the speaker 42. The captcha-purposed voice signal C_VS is provided to the user for obtaining a text for a voice signal and includes a first voice signal and a second voice signal. The first voice signal is extracted from the first database 111 and is a voice signal matched with the first text. The second voice signal is extracted from the second database 112 and is a voice signal matched with no text. The second voice signal may be logging data for the website or a speech recognition electronic device.

The captcha unit 130 outputs the first voice signal matched with the first text and the second voice signal matched with no text via a speaker 42. The first text matched with the first voice signal may be in a blind state where it is not provided to the user. The first voice signal and the second voice signal are output in a time series.

The voice signal for substantially performing a captcha function in the captcha-purposed voice signal corresponds to the first voice signal matched with the first text. The captcha unit 130 may refrain from notifying the user USER that only the first voice signal in the captcha-purposed voice signal is intended for performing the captcha function. This may be so done to prevent such an occasion that the user USER correctly enters the text corresponding to the first voice signal but maliciously enters an incorrect text as the text corresponding to the second voice signal. The captcha unit 130 may set a random order in which the first voice signal and the second voice signal are output.

In a second step S620, requested are a first input text and a second input text for the captcha-purposed voice signal C_VS. The captcha unit 130 may request input texts for the captcha-purposed voice signal C_VS via the speaker 42 or the display 41.

In a third step S630, the captcha unit 130 receives the first input text and the second input text and compares the first input text with a first text pre-matched with the first voice signal.

The receiving unit 120 receives the first input text and the second input text which the user USER enters via the input device, e.g., the keyboard 31. The first input text denotes entry of a phonetic representation for the first voice signal by the user USER who has listened to the first voice signal, and the second input text denotes entry of a phonetic representation for the second voice signal by the user USER who has listened to the second voice signal.

The captcha unit 130 identifies whether the first input text of the first input text and the second input text is identical to the first text.

When the first text is identical to the first input text in a fourth step S640 and a fifth step S650. the captcha unit 130 matches the second voice signal with the second input text and stores the match of the second voice signal and the second input text.

When the first input text is identical to the first text, the captcha unit 130 regards the first input text as entered by the user USER who is a human being. When the first input text is identical to the first text, the captcha unit 130 regards the second input text also as a correct phonetic representation for the second voice signal. The captcha unit 130 matches the second input text with the second voice signal which used to lack text matching and store the match of the second input text and the second voice signal in the first database 111.

Upon identifying that the user USER is a human being in the fourth step S640 and the fifth step S650, the captcha unit 130 may perform an additional step required by the user USER on the website.

When the first input text differs from the first text matched with the first voice signal in the fourth step S640, the captcha unit 130 may provide a new captcha-purposed voice signal C_VS to the user USER and repeats the second step S620 and its subsequent steps.

In the embodiment shown in FIG. 6, the fifth step S650 may further include the step of determining reliability. Described below is a method of matching the second voice signal with the second input text based on the result of reliability determination.

FIG. 8 is a flowchart illustrating a method of matching the second voice signal with the second input text based on reliability.

Referring to FIG. 8, in a first step S810, a plurality of second input texts matched with the same second voice signal are obtained. The captcha unit 130 may repeat the fifth step S650 of FIG. 6, thereby obtaining a plurality of second input texts matched with a particular second voice signal.

In a second step S820, the reliability determining unit 140 determines the reliability of the second input texts matched with the particular second voice signal.

In a third step S830, the reliability determining unit 140 determines whether the reliability of any second text is a threshold or more.

In the second step S820 and the third step S830, the reliability determining unit 140 may determine the reliability of corresponding second input texts based on the frequency of appearance of the plurality of second input texts. For example, the reliability determining unit 140 may determine that among the second input texts matched with the particular second voice signal, the ones with the larger frequency of appearance have the larger reliability.

To that end, the reliability determining unit 140 may divide same texts of the plurality of second input texts matched with the particular second voice signal from the rest of the second input text. For example, when the second input texts include ones corresponding to 'Hey LG,' ones corresponding to 'Hy LG,' and ones corresponding to 'Hei LG,' the reliability determining unit may count the second input texts corresponding to each of 'Hey LG,' 'Hy LG,' and 'Hei LG.'

When the proportion of the same second input texts is a preset threshold or more, the reliability determining unit 140 may determine that the reliability of the second input texts is the threshold or more.

For example, when 97 out of 100 second input texts are stored as 'Hey LG,' the reliability of the 97 second input texts is '95.' When one second input text is stored as 'Hy LG,' the reliability of the second input text is '1' and, when one second input text is stored as 'Hei LG,' the reliability of the second input text is '2.'

In a fourth step S840, the second text whose reliability is the threshold or more is matched with the second voice signal and stored. Thus, when the threshold is set to 95%. the reliability determining unit 140 matches the second input texts corresponding to 'Hey LG' with the second voice signal and store them.

In a fifth step S850, when the reliability is less than the threshold, the corresponding second text is dropped out. For example, the second input texts stored as 'Hy LG' and 'Hei LG' may be discarded.

In the embodiment of FIG. 8, the reliability determining unit 140 may discard incorrect input texts which result from typographical errors and input texts which result from the user's wrong phonetic representation.

FIG. 9 is a flowchart illustrating a method for building a database by matching texts with voice signals according to a second embodiment of the present invention. FIG. 10 is a view illustrating an example of providing a first and second text and receiving input voice signals according to the second embodiment.

A method for building a database by matching texts with voice signals according to the second embodiment is described below with reference to FIGS. 9 and 10.

In a first step S910, a captcha-purposed text C_TEXT including a first text and a second text is provided.

The captcha-purposed text C_TEXT may be provided as part of a captcha during the course of accessing a website or performing a particular procedure on the website.

For example, when a user USER signs up in a certain website, the captcha unit 130 may display an input window 111 on the display 41 which is displaying a webpage of the website. The input window 111 outputs the captcha-purposed text C_TEXT.

The captcha-purposed text C_TEXT is provided to the user for obtaining a voice signal for a text and includes a first text and a second text. The first text is extracted from the first database 111 and is a text matched with a first voice signal. The second text is extracted from the second database 112 and is a text matched with no voice signal. The second text may be logging data for the website or a speech recognition electronic device.

The captcha unit 130 displays the first text matched with the first voice signal and the second text matched with no voice signal via the input window 111. The first voice signal matched with the first text may be in a blind state where it is not provided to the user. The first text and the second text are output in a time series.

The text for substantially performing a captcha function in the captcha-purposed text corresponds to the first text matched with the first voice signal. The captcha unit 130 may refrain from notifying the user USER that only the first text in the captcha-purposed text is intended for performing the captcha function. This may be so done to prevent such an occasion that the user USER correctly enters the voice signal corresponding to the first text but maliciously enters an incorrect voice signal as the voice signal corresponding to the second text. The captcha unit 130 may set a random order in which the first text and the second text are output.

Requested in a second step S920 are a first input voice signal and a second input voice signal for the captcha-purposed text C_TEXT. The captcha unit 130 may request input voice signals for the captcha-purposed text C_TEXT via the speaker 42 or the display 41.

In a third step S930, the captcha unit 130 receives the first input voice signal and the second input voice signal and compares the first input voice signal with a first voice signal pre-matched with the first text.

The receiving unit 120 receives the first input voice signal and the second input voice signal which the user USER enters via the input device, e.g., the microphone 32. The first input voice signal denotes digital data into which a utterance for the first text has been converted by the user identifying the first text, and the second input voice signal denotes digital data into which a utterance for the second voice signal has been converted by the user identifying the second text. Although the drawings illustrate that the microphone 32 provides voice signals to the system 100, the system 100 may convert analog voice signals received from the microphone 32 into digital formats of voice signals.

The captcha unit 130 identifies whether the first input voice signal is identical to the first voice signal.

When the first voice signal is identical to the first input voice signal in a fourth step S940 and a fifth step S950, the captcha unit 130 matches the second text with the second input voice signal and stores the match of the second text and the second input voice signal.

When the first input voice signal is identical to the first voice signal, the captcha unit 130 regards the first input voice signal as entered by the user USER who is a human being. When the first input voice signal is identical to the first voice signal, the captcha unit 130 regards the second input voice signal also as a correct utterance for the second text. The captcha unit 130 matches the second input voice signal with the second text which used to lack voice signal matching and store the match of the second input voice signal and the second text in the first database 111.

Upon identifying that the user USER is a human being in the fourth step S940 and the fifth step S950, the captcha unit 130 may perform an additional step required by the user USER on the website.

When the first input voice signal differs from the first voice signal matched with the first text in the fourth step S940, the captcha unit 130 may provide a new captcha-purposed text C_TEXT to the user USER and repeats the second step S920 and its subsequent steps.

In the embodiment shown in FIG. 9, the fifth step S950 may further include the step of determining reliability. Described below is a method of matching the second text with the second input voice signal based on the result of reliability determination.

FIG. 11 is a flowchart illustrating a method of matching the second text with the second input voice signal based on reliability.

Referring to FIG. 11, in a first step S1110, a plurality of second input voice signals matched with a particular second text are obtained. The captcha unit 130 may repeat the fifth step S950 of FIG. 9, thereby obtaining a plurality of second input voice signals matched with the particular second text.

In a second step S1120, the reliability determining unit 140 determines the reliability of the second input voice signals matched with the particular second text.

In a third step S1130, the reliability determining unit 140 determines whether the reliability of any second voice signal is a threshold or more.

In the second step S1120 and the third step S1130, the reliability determining unit 140 may determine the reliability of corresponding second input voice signals based on the frequency of appearance of the plurality of second input voice signals. For example, the reliability determining unit 140 may determine that among the second input voice signals matched with the particular second text, the ones with the larger frequency of appearance have the larger reliability.

To that end, the reliability determining unit 140 may divide same voice signals of the plurality of second input voice signals matched with the particular second text from the rest of the second input voice signals. The same voice signals do not necessarily mean that their digital values are completely identical. The identity of the voice signal means that the digital size of the voice signal compared for each unit of time falls within a preset threshold.

When the proportion of the same second input voice signals is a preset threshold or more, the reliability determining unit 140 may determine that the reliability of the second input voice signals is the threshold or more. The above-described reliability determining method based on the proportion of second input texts may apply to the reliability determination based on the proportion of the second input voice signals.

In a fourth step S1140, the second voice signal whose reliability is the threshold or more is matched with the second text and stored.

In a fifth step S1150, when the reliability is less than the threshold, the corresponding second voice signal is dropped out.

FIG. 12 is a view illustrating a method of building a database according to another embodiment of the present invention.

Referring to FIG. 12, the system 100 may control the communication unit 150 to transmit voice signals and texts to an artificial intelligence (AI) processor included in the 5G network. The system 100 may control the communication unit 150 to receive AI-processed information from the AI processor. The AI-processed information may be final matching information. The final matching information denotes information in which voice signals are matched with texts.

The system 100 may transmit initial matching information obtained by the captcha unit 130 to the network based on DCI. The initial matching information may be the second voice signal and the second input text matched with each other by the captcha unit 130 or may be the second text and the second input voice signal matched with each other by the captcha unit 130 (S1200). The initial matching information may be transmitted to the 5G network via a physical uplink shared channel (PUSCH), and the DM-RSs of the synchronization signal block (SSB) and PUSCH may be quasi co-located (QCL) for QCL type D.

The 5G network may include an AI processor or an AI system, and the AI system of the 5G network may perform AI processing based on the received information.

The AI system may analyze the initial matching information received from the system 100. The AI system analyzes the initial matching information and assesses the reliability of the initial matching information (S1510). The AI system obtains the final matching information from the initial matching information based on the reliability (S1220).

The 5G network may transmit the final matching information obtained by the AI system to the system 100 via the communication unit (S1530).

The above-described invention may be implemented in computer-readable code in program-recorded media. The computer-readable media include all types of recording devices storing data readable by a computer system. Example computer-readable media may include hard disk drives (HDDs), solid state disks (SSDs), silicon disk drives (SDDs), ROMs, RAMs, CD-ROMs, magnetic tapes, floppy disks, and/or optical data storage, and may be implemented in carrier waveforms (e.g., transmissions over the Internet). The foregoing detailed description should not be interpreted not as limiting but as exemplary in all aspects. The scope of the present invention should be defined by reasonable interpretation of the appended claims and all equivalents and changes thereto should fall within the scope of the invention.

The foregoing features, structures, or effects are included in, but not limited to, at least one embodiment of the present invention. The features, structures, or effects exemplified in each embodiment may be combined or modified by one of ordinary skill in the art in other embodiments. Thus, such combinations or modifications should be interpreted as belonging to the scope of the present invention.

While the present invention has been shown and described with reference to exemplary embodiments thereof, it will be apparent to those of ordinary skill in the art that various changes in form and detail may be made thereto without departing from the spirit and scope of the present invention as defined by the following claims. For example, each component in the embodiments may be modified. Such modifications and applications should be construed as included in the scope of the present invention as defined by the appended claims.

What is claimed is:

1. A method of building a database in which voice signals match texts, the method comprising:
   extracting, by an artificial intelligence (AI) device in a cloud environment, from a first database, a first voice signal and a first text matched to the first voice signal, wherein the first text is the conversion of the first voice signal into text;
   extracting, by the AI device, from a second database, a second voice signal;
   providing, by the AI device, a captcha-purposed voice signal including the first voice signal and the second voice signal;

sending, by the AI device, a request for a first input text related to the first voice signal and a second input text related to the second voice signal for the captcha-purposed voice signal;

based on confirming that the first input text and the second input text are received, comparing the first text with the first input text;

based on confirming that the first text is identical to the first input text, determining the second input text being a second text, wherein the second text is the conversion of the second voice signal into text; and matching the second voice signal with the second input text and storing the match to the first database, wherein the matching the second voice signal with the second input text and the storing the match includes:

determining a reliability of the second input text; and based on the reliability being a predetermined level or more, matching the second voice signal with the second input text, and wherein the determining the reliability of the second input text further includes:

gathering a plurality of second input texts matched with the second voice signal;

classifying the plurality of second input texts among a same texts; and based on confirming that a proportion of the same texts among the plurality of second input texts is a preset threshold or more, determining that the reliability of the same texts is a predetermined level or more.

2. The method of claim 1, wherein the providing the captcha- purposed voice signal is provided upon preventing auto-registration in a website.

3. The method of claim 1, wherein the providing the captcha- purposed voice signal includes setting a random order in which the first voice signal and the second voice signal are provided.

4. The method of claim 1, wherein the second voice signal includes logging data for a website or a speech recognition electronic device.

5. The method of claim 1, wherein the determining the reliability of the second input text further includes receiving, from a network, downlink control information (DCI) used for scheduling transmission of the texts, and wherein the voice signals or the texts are transmitted to the network based on the DCI.

6. The method of claim 5, wherein the determining the reliability of the second input text further includes performing an initial access procedure with the network based on a synchronization signal block (SSB), wherein the texts are transmitted to the network via a physical uplink shared channel (PUSCH), and wherein demodulation-reference signals (DM-RSs) of the SSB and the PUSCH are quasi co-located (QCL) for QCL type D.

7. A method of building a database in which voice signals match texts, the method comprising:

extracting, by an artificial intelligence (AI) device in a cloud environment, from a first database, a first voice signal and a first text matched to the first voice signal, wherein the first voice signal is the conversion of the first text into voice;

extracting, by the AI device, from a second database, a second text;

providing, by the AI device, a captcha-purposed text including the first text and the second text;

sending, by the AI device, a request for a first input voice signal related to the first text and a second input voice signal related to the second text for the captcha -purposed text;

comparing the first voice signal with the first input voice signal;

based on the first voice signal being identical to the first input voice signal, determining the second input voice signal being a second voice signal, wherein the second voice signal is the conversion of the second text into voice; and matching the second text with the second input voice signal and storing the match to the first database, wherein the matching the second text with the second input voice signal and the storing the match includes:

determining a reliability of the second input voice signal; and based on the reliability being a predetermined level or more, matching the second text with the second input voice signal, and wherein the determining the reliability of the second input voice signal further includes:

gathering a plurality of second input voice signals matched with the second text;

classifying the plurality of second input voice signals among same voice signals; and based on confirming that a proportion of the same voice signals among the plurality of second input voice signals is a preset threshold or more, determining that the reliability of the same voice signals is a predetermined level or more.

8. The method of claim 7, wherein the providing the captcha- purposed text is provided upon preventing auto-registration in a website.

9. The method of claim 7, wherein the providing the captcha- purposed text includes setting a random order in which the first text and the second text are provided.

10. The method of claim 7, wherein the second text includes logging data for a web site.

11. The method of claim 7, wherein the determining the reliability of the second input voice signal further includes receiving, from a network, downlink control information (DCI) used for scheduling transmission of the voice signals, and wherein the voice signals are transmitted to the network based on the DCI.

12. The method of claim 11, wherein the determining the reliability of the second input voice signal further includes performing an initial access procedure with the network based on a synchronization signal block (SSB), wherein the voice signals are transmitted to the network via a physical uplink shared channel (PUSCH), and wherein demodulation-reference signals (DM-RSs) of the SSB and the PUSCH are quasi co-located (QCL) for QCL type D.

* * * * *